(12) United States Patent
De Poli et al.

(10) Patent No.: US 12,537,348 B2
(45) Date of Patent: Jan. 27, 2026

(54) BICYCLE EQUIPMENT PROVIDED WITH AN ELECTRIC POWER SUPPLY UNIT

(71) Applicant: CAMPAGNOLO S.R.L., Vicenza (IT)

(72) Inventors: Luca De Poli, Galliera Veneta (IT); Marco Minto, Mirano (IT)

(73) Assignee: CAMPAGNOLO S.R.L., Vicenza (IT)

( * ) Notice: Subject to any disclaimer, the term of this patent is extended or adjusted under 35 U.S.C. 154(b) by 634 days.

(21) Appl. No.: 17/954,017

(22) Filed: Sep. 27, 2022

(65) Prior Publication Data

US 2023/0112226 A1   Apr. 13, 2023

(30) Foreign Application Priority Data

Sep. 28, 2021   (IT) .................... 102021000024770

(51) Int. Cl.
| | |
|---|---|
| *H01R 13/73* | (2006.01) |
| *B62J 43/30* | (2020.01) |
| *B62M 25/08* | (2006.01) |
| *H01R 4/10* | (2006.01) |
| *H01R 13/52* | (2006.01) |
| *H01R 107/00* | (2006.01) |
| *H02J 7/00* | (2006.01) |

(52) U.S. Cl.
CPC ............. *H01R 13/73* (2013.01); *B62M 25/08* (2013.01); *H01R 4/10* (2013.01); *H01R 13/521* (2013.01); *H01R 13/5221* (2013.01); *H02J 7/0045* (2013.01); *B62J 43/30* (2020.02); *H01R 2107/00* (2013.01)

(58) Field of Classification Search
CPC ........ H01R 13/73; H01R 4/10; H01R 13/521; H01R 13/5221; H01R 2107/00; B62M 25/08; B62M 9/122; H02J 7/0045; B62J 43/30

USPC .......................................................... 439/271
See application file for complete search history.

(56) References Cited

U.S. PATENT DOCUMENTS

| | | | |
|---|---|---|---|
| 10,981,625 B2 | 4/2021 | Brown et al. | |
| 11,535,339 B2* | 12/2022 | Ichida | ................... B62M 25/08 |
| 11,685,469 B2* | 6/2023 | Yamamoto | ............. B62K 23/02 |
| | | | 474/69 |
| 2017/0101160 A1* | 4/2017 | Nishino | ................ B62M 9/135 |

(Continued)

OTHER PUBLICATIONS

Search Report for Italian Application No. 102021000024770 dated Jun. 13, 2022.

*Primary Examiner* — Tulsidas C Patel
*Assistant Examiner* — Jeffrey Mountain
(74) *Attorney, Agent, or Firm* — Ipsilon USA—NLO

(57) ABSTRACT

A bicycle equipment is provided, including an electric power supply unit electrically connected to a first electric connector; a first component; a second component with an electrically powered device and a second connector. A through hole is provided in the first or second component. An electric connector assembly includes a third connector matching the first connector and permanently connected to the first component at a seat for the electric power supply unit; a fourth connector matching the second connector; and an electric cable extending between the third connector and the fourth connector. The through hole, the third connector and the fourth connector are sized such that the fourth connector may pass, in at least one orientation thereof, in the through hole and the third connector may not pass in the through hole.

16 Claims, 7 Drawing Sheets

(56) References Cited

U.S. PATENT DOCUMENTS

2017/0113759 A1* 4/2017 Watarai .................. B62J 43/30
2020/0255089 A1  8/2020 Shipman et al.

* cited by examiner

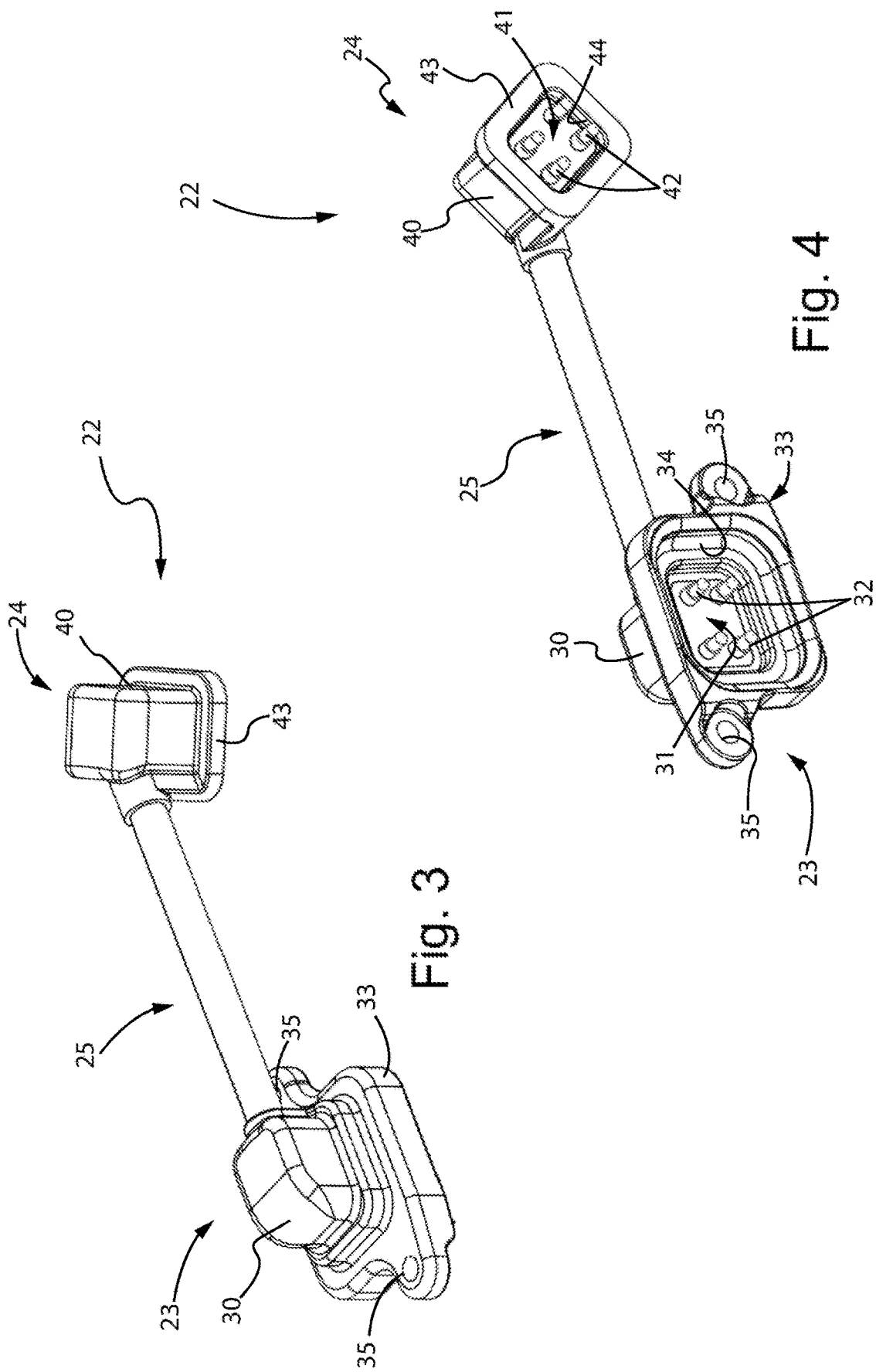

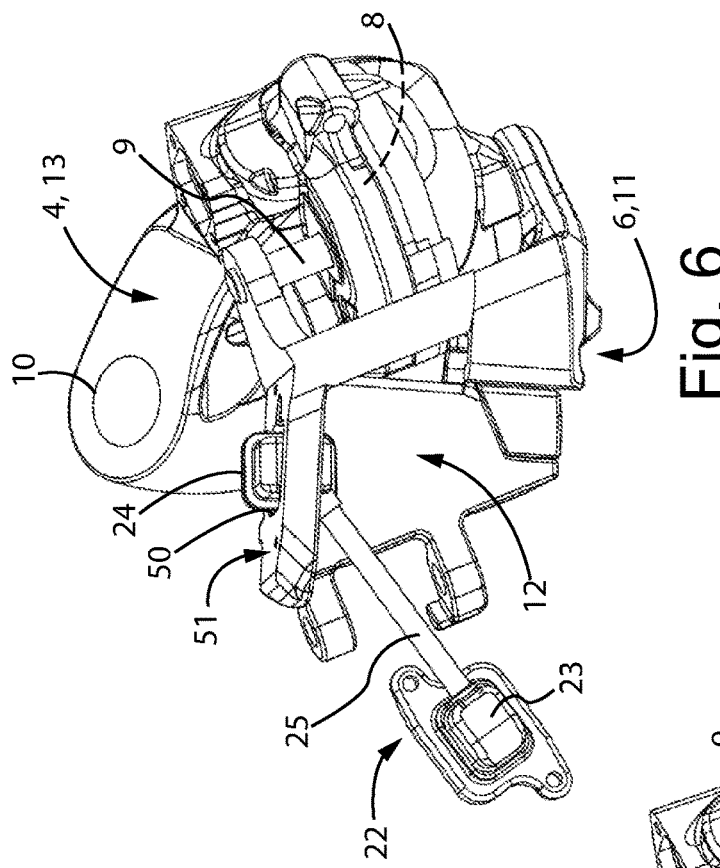
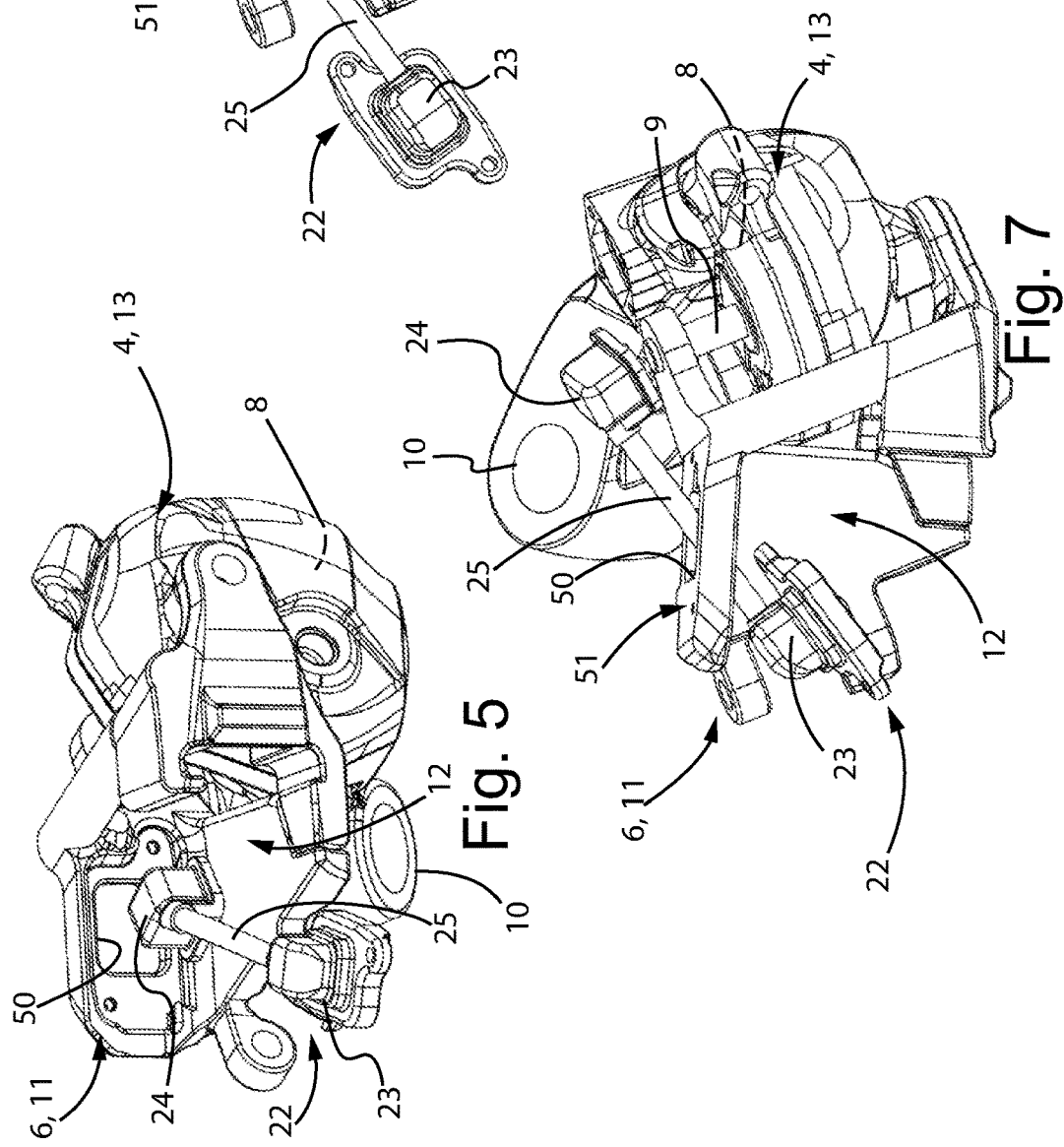

BICYCLE EQUIPMENT PROVIDED WITH AN ELECTRIC POWER SUPPLY UNIT

CROSS REFERENCE TO RELATED APPLICATIONS

This application claims the benefit of Italian Patent Application No. 102021000024770, filed on Sep. 28, 2021, which is incorporated herein by reference as if fully set forth.

FIELD OF INVENTION

The present invention relates in general to a bicycle equipment provided with an electric power supply unit.

BACKGROUND

Bicycle electric/electronic pieces of equipment which require an electric power supply unit, typically of the secondary cell battery type, comprise for example a derailleur associated with the bottom bracket spindle, a derailleur associated with the hub of the rear wheel, a suspension, a saddle setting adjuster, a lighting system, a satellite navigator, a training device, an anti-theft device, a cycle computer capable of providing information on the status of the bicycle, of the cyclist and/or of the route, a torque or power meter, a motor of a pedal assisted bicycle, a manual control device of another equipment, and others.

Sometimes it is not possible or it is not desirable that the electric power supply unit is supported by the same component that houses the electrically powered device of the equipment, for example a geared motor of a derailleur and/or its control electronics. In these cases, typically an electric connector connected to the secondary cells of the electric power supply unit is provided at the end of a cable exiting from a hermetic case containing it, of a sufficient length to reach the component housing the electrically powered device, at which a matching connector is provided.

In other cases, a dual embodiment is provided, wherein a cable provided with an electric connector exits from the hermetic case of the electrically powered device, whereas on the side of the electric power supply unit, the matching connector is provided for.

Both known solutions may pose remarkable restrictions in the design and during assembly of the equipment. Furthermore, the matching connector is not always easily accessible, what entails a considerable inconvenience both during assembly, and each time the electric power supply unit is seated or is detached in case the electric power supply unit is removably attached to the bicycle equipment, in order to allow recharge thereof from the mains (possibly through a recharge base) besides any possibility of recharging it on board of the bicycle, and/or in order to allow its replacement in case of performance degradation.

Furthermore, in case of cable wear, a drawback that occurs especially but not only when the two components are in mutual motion and the cable is subject to flexure and/or torsion, for its replacement it is necessary to access the internal of the component from which it departs, and to restore the hermetic seal thereof upon replacement, what in turn poses restrictions to the practical embodiment of such hermetic seal; furthermore for said operation, a qualified operator is typically necessary.

The technical problem at the basis of the invention is to provide an alternative solution, and which obviates to the above-mentioned drawbacks to connect the electric power supply unit to an electrically powered device housed in a component different from the one that supports the electric power supply unit.

SUMMARY

The disclosed bicycle equipment comprises: an electric power supply unit electrically connected to a first electric connector; a first component; a second component with an electrically powered device and a second connector. A through hole is provided in the first component or in the second component. An electric connector assembly includes a third connector matching the first connector and permanently connected to the first component at a seat for the electric power supply unit; a fourth connector matching the second connector; and an electric cable extending between the third connector and the fourth connector. The through hole, the third connector and the fourth connector are sized such that the fourth connector may pass, in at least one orientation thereof, in the through hole and the third connector may not pass in the through hole.

BRIEF DESCRIPTION OF THE DRAWINGS

Further features and advantages of the present invention will become clearer from the following detailed description of some preferred embodiments thereof, made with reference to the attached drawings, wherein:

FIGS. 3 and 4 are two different perspective views of an electric connector assembly of the bicycle equipment, FIGS. 5-7 show some steps during the installation movement of the electric connector assembly in the bicycle equipment, of which only the involved components are shown, in a mounting method.

DETAILED DESCRIPTION OF EMBODIMENTS

Figure 1:
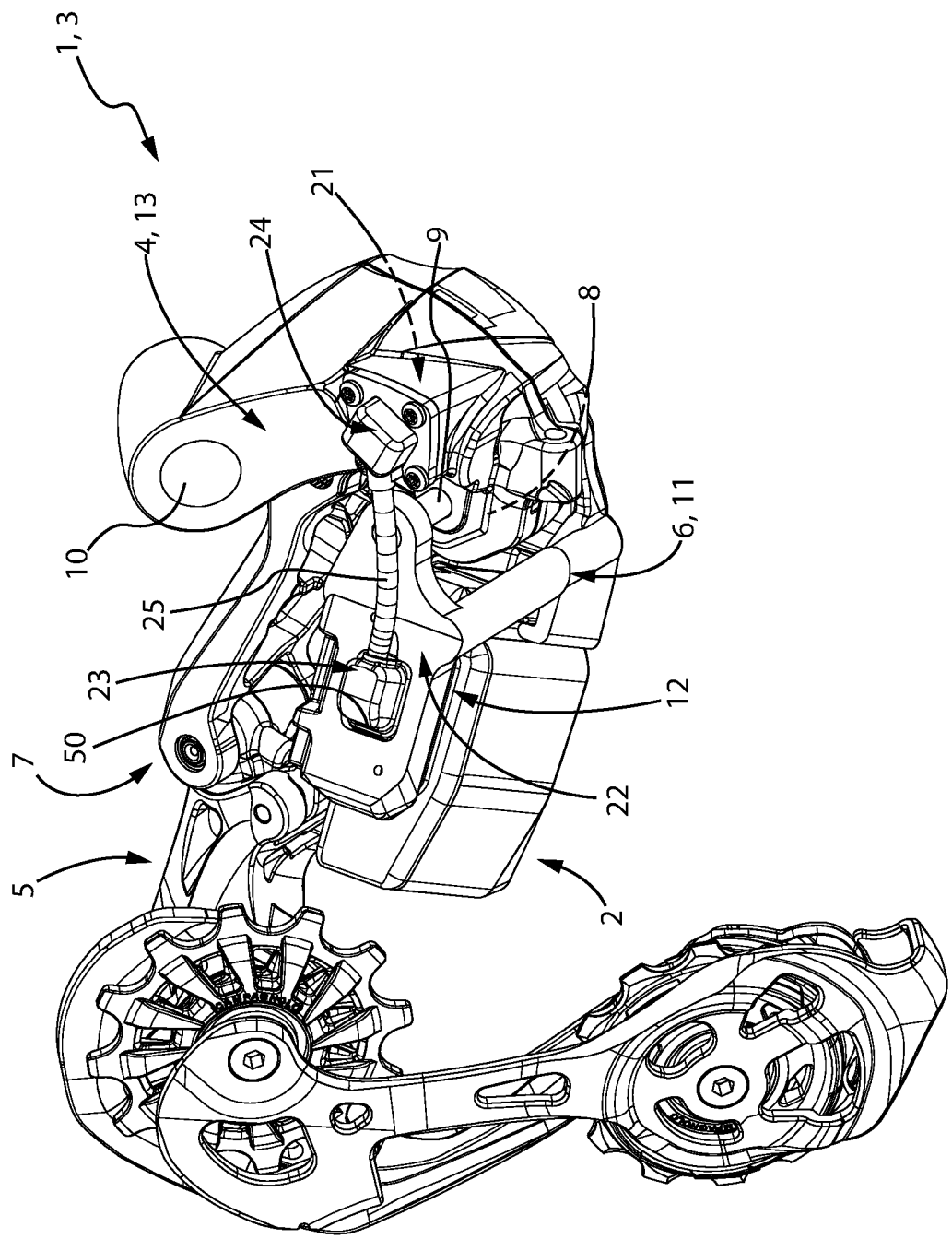
FIG. 1 is a perspective view of a bicycle equipment provided with an electric power supply unit.

In the present disclosure, under "equipment" a set of components mechanically coupled with each other and configured to be attached to the bicycle in a single location is meant to be understood. Thus, the equipment may comprise for example a derailleur or a manual control device for a derailleur attachable to the handlebars or in proximity thereto, but not the assembly of both.

In the present disclosure, expression "electric/electronic" is used to indicate an electric device that may also include electronic components and/or a data processing system.

In the present disclosure, under "matching" electric connectors it is meant to indicate that they have a plurality of electric contacts in one-to-one correspondence and that the physical configuration of the electric contacts and of the connectors overall is complementary so as to allow a mechanical coupling of the connectors that brings the matching electric contacts into mechanical and electric contact.

In the present disclosure, a mechanical connection between two members is said to be "removable" if it allows them to be detached without the aid of tools, "permanent" if it allows them to be detached only with the aid of tools, and "fixed" it the detachment may only take place damaging at least one of the two members.

In an aspect, the invention relates to an electrically powered bicycle equipment, comprising:
- an electric power supply unit comprising one or more secondary cells electrically connected to a first electric connector,
- a first component comprising an attachment seat of the electric power supply unit,
- a second component different from the first component, an electrically powered device being supported by the second component and the second component having a second electric connector electrically connected to the electrically powered device,
- wherein a through hole is provided in the first component or in the second component,
- an electric connector assembly extended between the first component and the second component, comprising:
- a third electric connector matching the first electric connector and permanently connected to the first component at the seat,
- a fourth electric connector matching second electric connector, and
- an electric cable extended between the third connector and the fourth connector,
- wherein the through hole, the third connector and the fourth connector have such mutual size that either one of the two electric connectors of the electric connector assembly may pass, in at least one orientation thereof, in the through hole and the other one of the two electric connectors of the electric connector assembly may not pass in the hole.

Thanks to the electric connector assembly it is possible to favour the assembly of the bicycle equipment, what is considerably important in view of the small size of the involved components and of their mechanical connection. The provision thereof thus favours the embodiment of the equipment with smaller size and therefore smaller occupied space and weight, a factor which is of great relevance at least in the racing bicycle field.

The electric connector assembly may furthermore be easily replaced in case of wear of the connection cable, also by a non-specialised operator.

The second component may be movable with respect to the first component during the intended use of the equipment.

The cable electric is in that case provided with a sufficient flexibility to allow its flexure and/or torsion during the assembly and/or the use of the bicycle equipment.

The electric cable may be connected to the third and to the fourth connectors in a fixed and hermetically sealed manner.

A gasket may be interposed between the first and the third connectors.

The third connector may be permanently connected to the first component on the side of the through hole corresponding to the seat, without any sealing gasket interposed between the third connector and the first component.

Thanks to the fact that the third connector is arranged on the side of the through hole corresponding to the seat, no sealing gasket is necessary between the third connector and the first component.

The seat may be formed internally to a case, preferably hermetic, of the first component and the only one necessary sealing gasket may be, if any, between the first and the third connectors.

The third connector may comprise a first body wherein a first open chamber is defined, containing the respective electric contacts, a first flange being provided for at the mouth of the first chamber, the first end of the electric cable extending from the first body, and wherein the third connector is permanently connected to the first component with the first flange on the side of the seat and the first body extended through or in the through hole.

The electrically powered device may be housed in a case, preferably hermetic, of the second component.

The fourth connector may be permanently connected to the case of the second component from the outside.

The fourth connector may comprise a second body wherein a second open chamber is defined, containing the respective electric contacts, a second flange being provided for at the mouth of the second chamber, the second end of the electric cable extending from the second body.

The second flange may be without holes, a presser having a through cavity sized to accommodate the second body pressing the second flange on the second component from the outside.

The presser may comprise a slit extending up to its peripheral surface, sized allow passage of the electric cable.

A gasket may be interposed between the second flange and the second component.

The connectors and the cable may be also provided for the communication of data signals.

The electric contacts of one and a same among the first, the second, the third and the fourth connectors, preferably the electric contacts of one and a same between the third and the fourth connectors, may be of the pogo pin type.

In at least one of the first and the third connectors and/or in at least one of the second and the fourth connectors, the electric ground contact may be more outcropping than the other electric contacts.

The matching electric contacts of the first and of the third connectors and/or of the second and of the fourth connectors may be arranged in a protrusion and a cavity of complementary shapes. For example, the pogo pin contacts may be arranged in a cavity of the third connector and/or in a cavity of the fourth connector so as not to protrude when and be protected during handling of the electric connector assembly nor when the electric power supply unit is not seated, in case the latter is removably attachable to the seat.

The protrusion may have a peripheral groove, a hermetic seal gasket extending in said peripheral groove.

The electric power supply unit may be removably attachable to the seat, the first and the third connectors being removably connectable.

In that case, preferably the first electric connector is the electric connector of the electric power supply unit itself.

The bicycle equipment may be a bicycle derailleur comprising:

a plurality of mutually movable components, comprising a support body configured to be attached to a bicycle frame, a chain guide and a pair of connecting arms extended between the support body and the chain guide, and a geared motor controlling the mutual motion between chain guide and support body, wherein said first component and said second component are two preselected components of the mutually movable components.

In the present disclosure, term "chain guide" is used to indicate the component which, overall, is moved with respect to the support body and to the connecting arms; in the case of a rear derailleur it may include a first member articulated in the articulated parallelogram, sometimes called "bottom body", and a second member movable therewith, sometimes called "rocker arm", while in the case of a front derailleur it typically comprises a single member, sometimes called "cage".

In the present disclosure, under term "geared motor", a motor not coupled with any speed reducer is meant to be encompassed.

The derailleur is, for example, a rear derailleur.

In that case, the first component may be for example the proximal connecting arm and/or the second component may be the support body.

In the present disclosure, adjectives such as "proximal" and "distal" refer to the mounted condition of the derailleur on the bicycle. In particular, "proximal" is used to indicate closer to the frame and adjective "distal" is used to indicate farther from the frame.

The derailleur may also include a data processing system, controlling the geared motor and any other electric/electronic components of the derailleur. The data processing system may comprise electric components and/or discrete electronic components and/or a micro-controller, that may also integrate memory means. The data processing system may be borne for example on at least one printed circuit board or PCB. The derailleur may thus be electronic.

In another aspect, the invention relates to a mounting method of an electric connector, for an electric power supply unit comprising one or more secondary cells electrically connected to an electric connector matching the electric connector to be mounted, at a seat of a first component of a bicycle equipment comprising an electrically powered device supported by a second component different from the first component, comprising:

providing an electric connector in the second component, providing an electric connector assembly, comprising two electric connectors one of which is said electric connector to be mounted and the other one is a connector matching the electric connector of the second component, and an electric cable extended between its two electric connectors, providing a through hole in one of the first component and the second component, wherein the through hole and the two electric connectors of the electric connector assembly have such mutual size that either one of the two electric connectors of the electric connector assembly may pass, in at least one orientation thereof, in the through hole and the other one of the two electric connectors of the electric connector assembly may not pass in the hole, let said one of the two electric connectors of the electric connector assembly pass through the through hole, successively, permanently connecting said electric connector to be mounted to the first component and said connector matching the electric connector of the second component to the second component.

Secondary features of such a method correspond, mutatis mutandis, to what has been described above.

With reference to the drawings, in FIG. 1 an illustrative bicycle equipment 1 is shown, provided with an electric power supply unit 2.

In the case shown, the bicycle equipment 1 is a rear derailleur 3 comprising a support body 4 configured to be attached to a bicycle frame, a chain guide 5 and a pair of connecting arms 6, 7 extended between the support body 4 and the chain guide 5, forming a plurality of components distinct from each other.

Said components 4, 5, 6, 7 are also mutually movable, and in particular they form an articulated parallelogram, in a manner per se well known.

The pair of connecting arms comprises a proximal connecting arm 6 and a distal connecting arm 7.

The derailleur 3 comprises a geared motor 8, of which the output shaft 9 is visible in FIG. 1. In the present disclosure, under term "shaft" the driving shaft or the output shaft of the speed reducer is meant, respectively in the case of absence and presence of a speed reducer.

The geared motor 8 may be merely electric or electronic, when the derailleur 3 further includes a data processing system controlling the geared motor 8 and any other electric/electronic components of the derailleur 3, for example comprising one or more components borne by one or more printed circuit boards or PCB. As mentioned above, the geared motor 8 may also comprise a motor not coupled with any speed reducer.

The geared motor 8 controls the mutual motion between chain guide 5 and support body 4, in particular it determines the aperture and closure of the articulated parallelogram, and therefore a displacement of the chain guide 5 having at least one displacement component in the direction of the axis of the group of toothed wheels associated with the hub of the rear wheel or "sprocket assembly", so as to bring the transmission chain or belt into engagement with a predetermined toothed wheel or sprocket of the sprocket assembly. In the case of a front derailleur, the displacement of the chain guide 5 has at least one displacement component in the direction of the bottom bracket spindle, so as to bring the transmission chain (or belt) into engagement with a preselected toothed wheel or chainring of the "crankset".

The geared motor 8 is for example housed in the support body 4, as shown, and controls the rotation of one of the connecting arms 6, 7 (in the case shown, the proximal connecting arm 6) about a pivotal axis thereof to the support body 4. The shaft 9 is shown directly coupled with the proximal connecting arm 6, but this is not strictly necessary.

The support body 4 may be attached to the frame for example through an articulated joint (not shown) engaged in a hole 10 thereof. Those skilled in the art will understand that the derailleur 3 may have a shape even considerably different from that shown and/or additional components not shown for the sake of simplicity.

The electric power supply unit 2 comprises one or more secondary cells housed in a hermetic case. The electric power supply unit 2 may further include at least one printed circuit board or PCB (not shown) bearing electronic components controlling the electric power supply unit 2, housed in the hermetic case. The electric power supply unit 2 may therefore be a so-called smart battery.

A first component of the derailleur 1, the proximal connecting arm 6 in the case shown, has a seat 12 for attachment of the electric power supply unit 2. The component having the seat 12 for the electric power supply unit 2 is not necessarily the proximal connecting arm 6 and therefore sometimes hereinbelow reference will be made thereto as first component 11. Equally, the geared motor 8 may be housed in a component different from the support body 4 and therefore sometimes hereinbelow reference will be made to the component bearing the geared motor 8 as second component 13.

The seat 12 is configured to accommodate at least in part the electric power supply unit 2 and/or support and/or hold it in any suitable manner. The specific configuration of the seat 12 may also be appreciably different from what has been shown and its configuration is irrelevant for the purposes of the present invention and therefore it is not described in detail. However, a sliding guide 14 may be recognized, to guide the seating of the electric power supply unit 2, whereas possible means provided for mechanically locking part of the electric power supply unit 2 so as to firmly hold it on the derailleur 3, despite the vibrations and shocks to which it is subject during the bicycle travel, are not shown.

Figure 2:
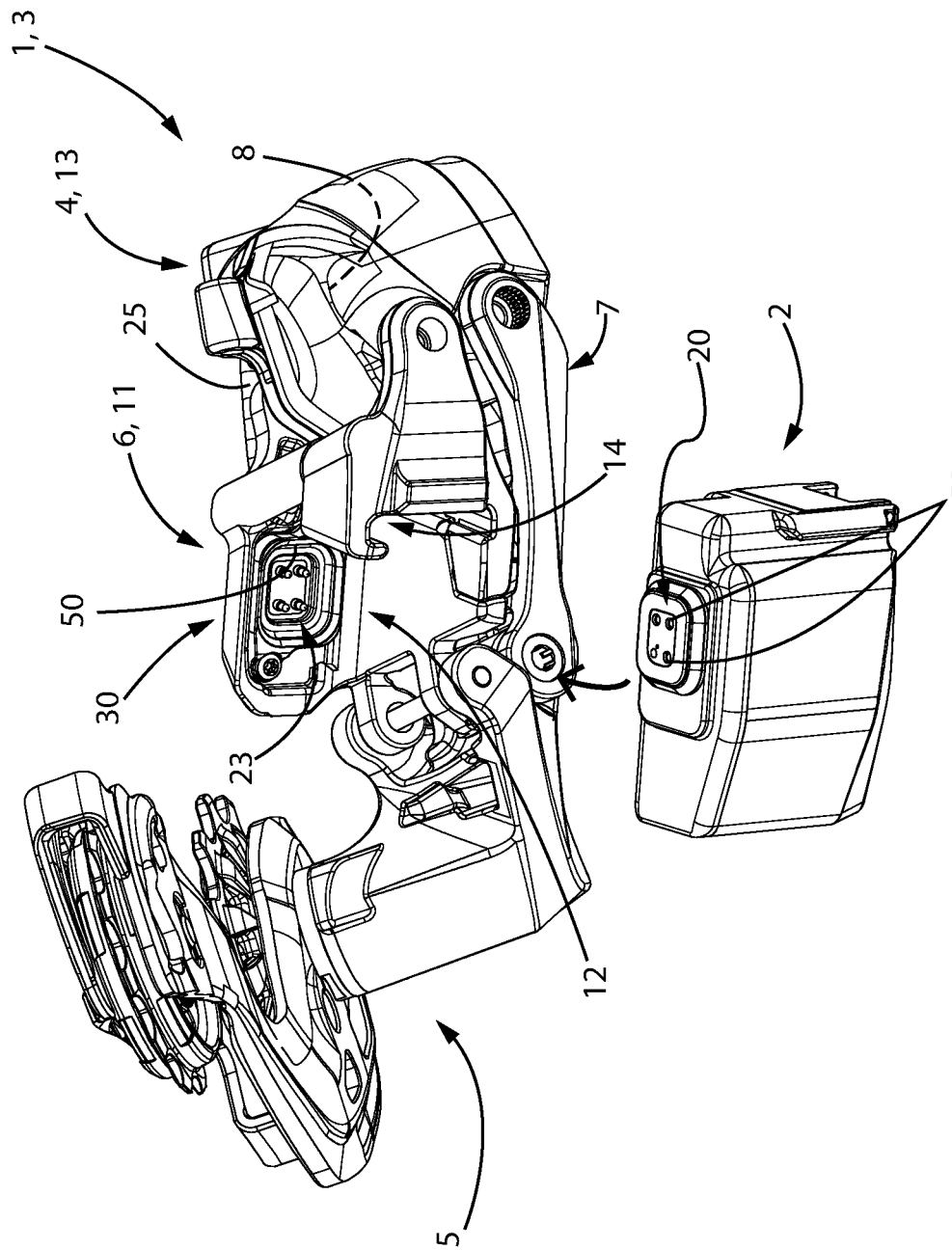
FIG. 2 is a perspective view of an electric power supply unit in a condition detached from a component of the bicycle equipment supporting it.

The electric power supply unit 2 comprises a first electric connector 20. Adjective electric referred to the connectors will sometimes be omitted hereinbelow for the sake of brevity. In FIG. 2, the electric power supply unit 2 is shown upside down with respect to the first component 11 merely in order to show the first connector 20.

In the case shown, the electric power supply unit 2 is removably attached to the derailleur 3 and is shown in the detached condition in FIG. 2.

Figure 11:
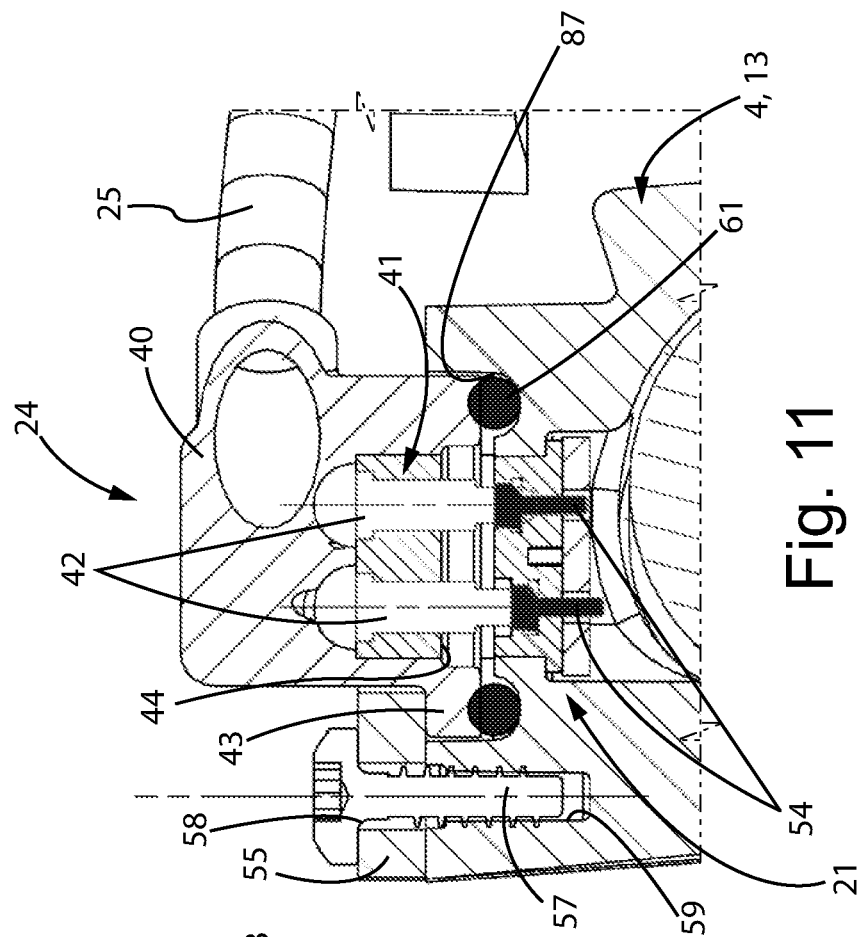
FIG. 11 is a partial sectional view through said other connector of the electric connector assembly connected in the bicycle equipment, with the matching electric connector.
Figure 10:
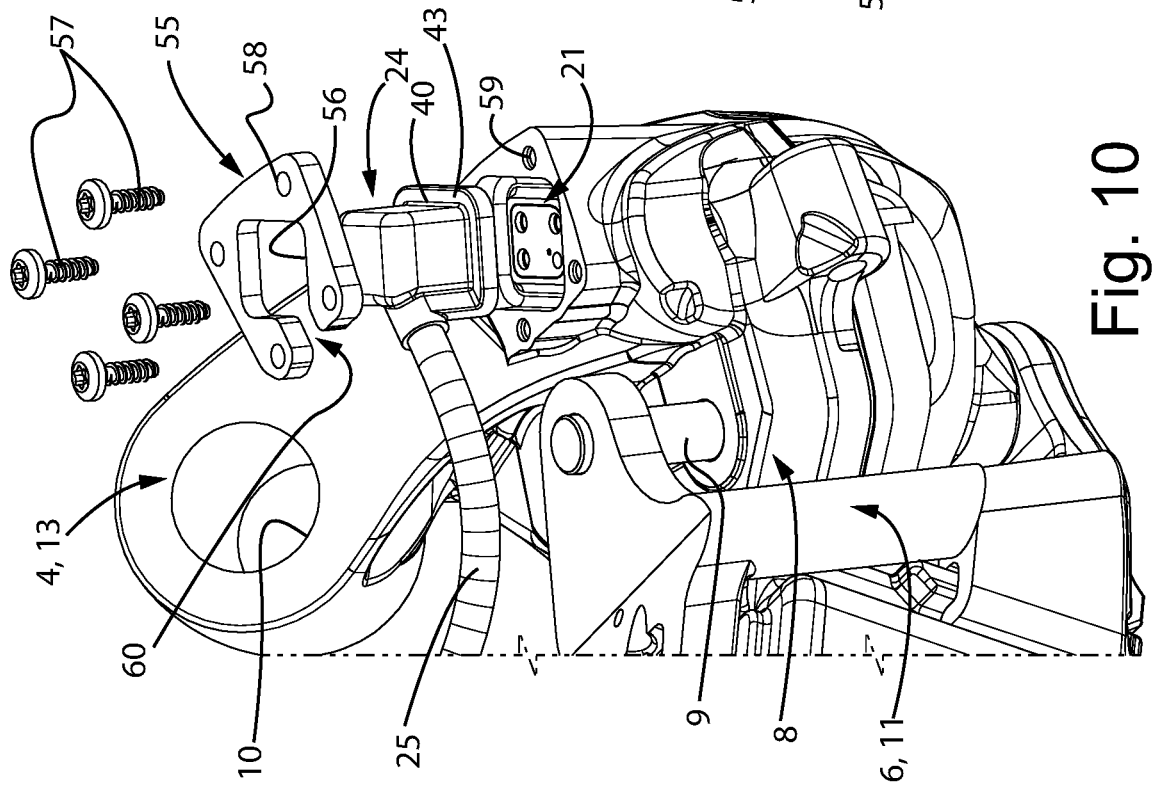
FIG. 10 is a detail view, partially broken away and partially exploded, of another connector of the electric connector assembly connected in the bicycle equipment, with a matching electric connector.

The second component 13, in the case shown the support body 4, comprises a second connector 21, which position is only schematically shown in FIG. 1, and which is shown in FIGS. 10, 11.

A third connector 23 matching the first connector 20 is provided at the seat 12, and is connected to the first component 11. In the case of a removable electric power supply unit 2, the first and the third connectors 20, 23 removably connect to each other in the seated, possibly locked condition of the electric power supply unit 2, in order to establish electric connection.

The third connector 23 is part of an electric connector assembly 22, leading the power supply from the electric power supply unit 2 and in general electrically connecting the latter to the second component 13, wherein the geared motor 8 is housed as said, besides any other electrically powered devices.

With reference also to FIGS. 3 and 4, the electric connector assembly 22 comprises, besides the third connector 23, a fourth connector 24 and an electric cable 25 extended between the third connector 23 and the fourth connector 24.

The cable 25 may be provided with a certain flexibility allowing its flexure and/or the torsion during assembly and/or during use of the bicycle equipment, in particular when the second component 13 is movable with respect to the first component 11, as in the non-limiting illustrative case of the components of the derailleur 3.

The second connector 21 matches the fourth connector 24. The second and the fourth connector 21, 24 may be permanently connected, in the manner better described hereinafter, and in particular they may remain connected regardless of whether the electric power supply unit 2 is seated or not.

The cable 25 is fixedly connected to the third and to the fourth connectors 23, 24. The three members are integral with each other, so that the electric connector assembly 22 is a single member in the equipment 1. The connection between the cable 25 and the third and the fourth connectors 23, 24 is, in particular, a hermetically sealing one.

The third connector 23 comprises a body 30 wherein an open chamber 31 is defined, containing, i.a., the electric contacts 32. A flange 33 is provided at the mouth 34 of the chamber 31. In the case shown the flange 33 is flat and it is provided with holes 35 to be permanently connected at the seat 12 (in the manner described hereinbelow) through screws 36 (cf. FIG. 8).

The associated end of the cable 25 extends from the body 30 and therefore from the side opposite the mouth 34 with respect to the flange 33. In the case shown, the cable 25 extends laterally from the body 30 and in particular in a direction that, locally, is substantially parallel to the plane defined by the flange 33, but this is not strictly necessary and the cable 25 might extend from the rear of the body 30 (opposite the mouth 34) and/or in other directions.

Analogously, the fourth connector 24 comprises a body 40 wherein an open chamber 41 is defined, containing i.a. the electric contacts 42. A flange 43 is provided at the mouth 44 of the chamber 41. In the case shown the flange 43 is flat and is without holes, to be permanently connected to the second component 13 in the manner described hereinbelow with reference to FIGS. 10-11.

The associated end of the cable 25 extends from the body 40 and therefore from the opposite side to the mouth 44 with respect to the flange 43. In the case shown, the cable 25 extends laterally from the body 40 and in particular from a lateral edge of the body 40 and in a direction that, locally, is substantially parallel to the plane defined by the flange 43; however this is not strictly necessary, and the cable 25 might extend from the rear of the body 40 (opposite the mouth 44), from a flat side face thereof and/or in other directions.

In the case shown, the body 30, 40 of each of the two connectors 23, 24 has substantially the shape of a straight rectangular prism, with a substantially rectangular mouth 34, 44, but this is not strictly necessary. Merely by way of an example, either one of the two connectors 23, 24 might have a substantially cylindrical body or a body in the shape of a straight prism with trapezoidal base. It is not even necessary that the shape of the mouth 34, 44 and the cross-sectional shape of the respective body 30, 40 are provided with similitude, in the geometrical meaning of the term. It is emphasised that the connectors 23, 24 may have shapes even considerably more different from each other than what has been shown.

However, the fourth connector 24 is, stated in general terms, smaller than the third connector 23. The third and the fourth connectors 23, 24 have such mutual size that the fourth connector 24 may pass, in at least one orientation thereof, in a through hole and the third connector 23 may not pass in the through hole.

In the case shown, as manifest from FIGS. 1 and 5-7, such a through hole 50 is provided in the first component 11.

In greater detail, in the case shown the hole 50 is at the seat 12.

In other terms it may be said that the fourth connector 24 has (in the electric connector assembly 22 and therefore account being taken of its connection to cable 25) a "convex hull"—defined as the smallest convex solid that entirely contains it—a projection of which, in at least one plane, may be inscribed in the figure defined by the intersection between the body 30 and the flange 33 of the third connector 23, that in the case shown is the largest portion. With reference to the equipment 1, the fourth connector 24 has a convex hull a projection of which, in at least one plane, may be inscribed in the opening of the through hole 50.

Figure 9:
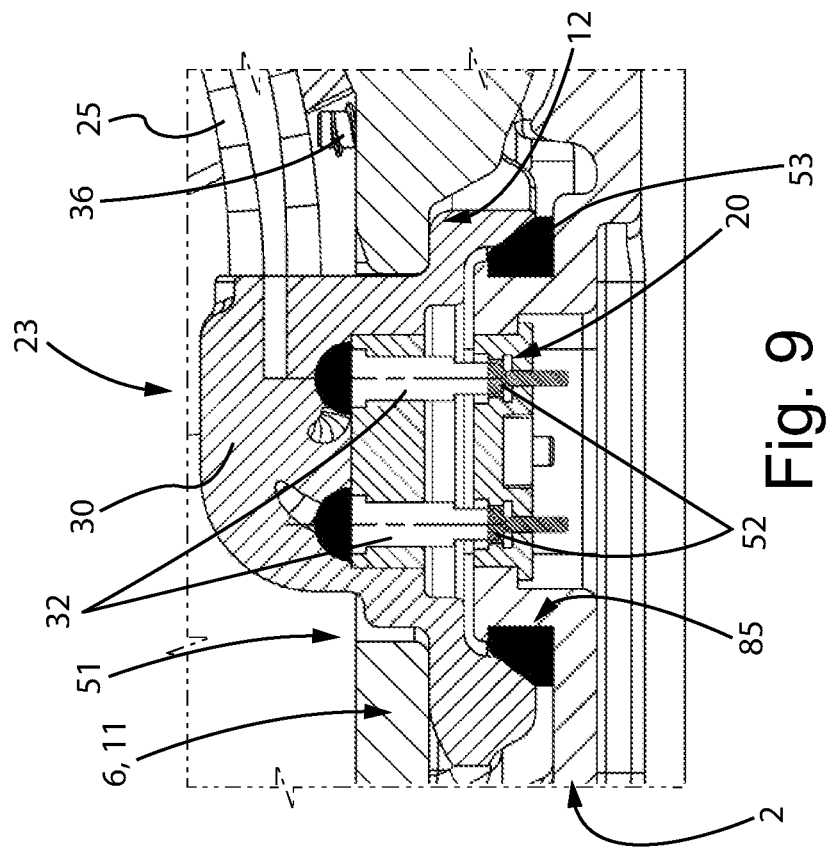
FIG. 9 is a partial sectional view through the connector of the electric connector assembly connected in the bicycle equipment, with a matching electric connector.
Figure 8:
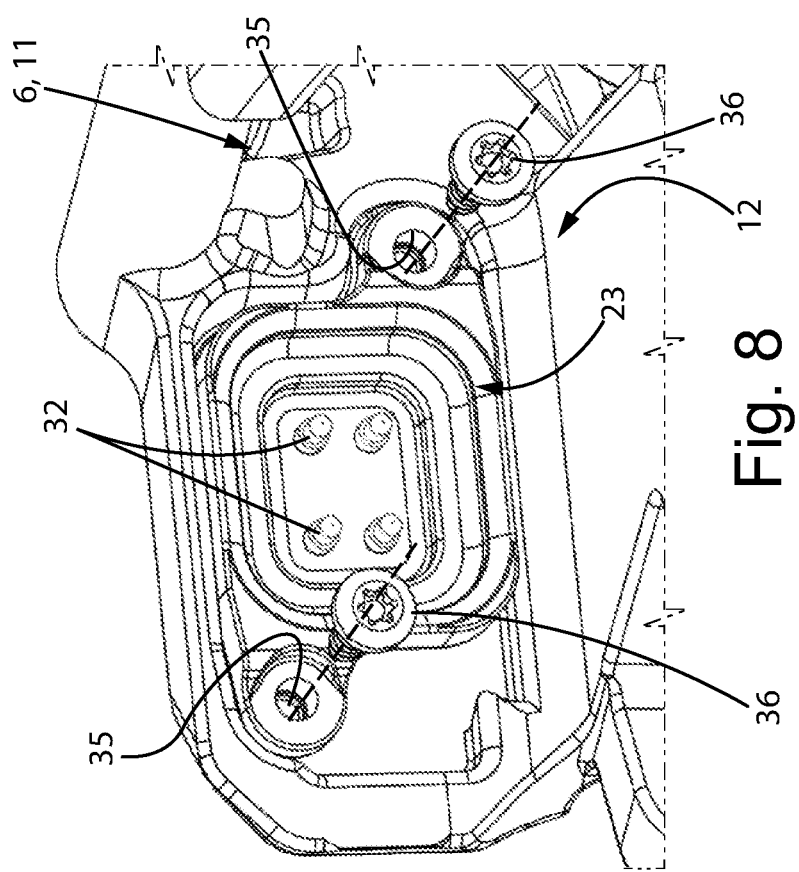
FIG. 8 is a detail view, partially broken away and partially exploded, of a connector of the electric connector assembly connected in the bicycle equipment.

FIGS. 5-11 shown in greater detail how the electric connector assembly 22 is mounted in the equipment 1. First (FIG. 5) the connector assembly 22 is brought closer to the hole 50 from the side of the seat 12 for the electric power supply unit 2, with its fourth connector 24 ahead in the approaching direction. Subsequently, the fourth connector 24 is made to pass in the through hole 50, inserting it thereinto from the side of the seat 12 towards the opposite side 51 (FIGS. 6-7); in this step, it may be necessary to conveniently orient the fourth connector 24 with respect to the through hole 50. The third connector 23 is then brought at the seat 12—therefore pushed from the side of the seat 12 or pulled from the opposite side 51—bringing, in the case shown, the entire cable 25 through the through hole 50 (FIGS. 8-9).

The two connectors 23, 24 are then located on the opposite sides of the through hole 50.

The third connector 23 is then permanently connected to the first component 11, in the case shown at the seat 12.

The fourth connector 24 is then permanently connected to the second component 13 (FIGS. 10-11), for example in the manner better described hereinbelow.

It is understood that the order of connection of the third connector 23 and the fourth connector 24 in the equipment 1 may be inverted.

In the case shown, the hole 50 is sized to prevent the passage of the third connector 23 at least in the orientation it has in the mounted condition at the seat 12.

In greater detail, in the case shown the through hole 50 is sized to form-fittingly accommodate the body 30 of the third connector 23, at least in part, and prevent the passage of the flange 33 of the third connector 23.

The third connector 23 is then permanently connected to the first component 11, with the flange 33 on the side of the seat 12 and for example with the above-mentioned screws 36 extended in the holes 35 of the flange 33 and in screw engagement in the first component 11.

With particular reference to FIGS. 8-9, when the electric power supply unit 2 is seated, its first connector 20 is connected to the third connector 23, in particular its electric contacts 52 enter into contact with the electric contacts 32 of the third connector 23. The first and the third connectors 20, 23 are directly connected, for example in a removable manner if the electric power supply unit 2 is removably attached to the derailleur 3, thanks to the fact that the third connector 23 is connected to the first component 11 from the side of the seat 12—with respect to the through hole 50—and is therefore directly accessible by the first connector 20.

For the sake of simplicity, in FIG. 9 the electric conductors extended from the individual electric contacts 32 and gathered in the cable 25 are not shown, nor are the electric conductors extended internally to the electric power supply unit 2 from the individual electric contacts 52 to the secondary cells and/or to the PCB in the case of a smart battery.

In order to ensure the hermetic sealing, a gasket 53, for example elastomeric, may be provided between the first and the third connectors 20, 23.

Thanks to the fact that the third connector 23 is connected to the first component 11, on the side of the through hole corresponding to the seat—in other terms, on the side of the seat 12 with respect to the through hole 50-, no sealing gasket between the third connector 23 and the first component 11 is conversely necessary.

This provision lowers the number of wearable components, and in general simplifies the equipment. In the through hole 50, a throat for a sealing gasket is not necessary.

In turn, the fact that the third connector 23 is arranged on the side of the seat 12 is possible thanks to the above-mentioned size ratio between the third and the fourth connectors 23, 24 and between them and the through hole 50.

With particular reference to FIGS. 10-11, the fourth connector 24 is connected to the second connector 21, in particular the electric contacts 42 of the fourth connector 24 enter into contact with the electric contacts 54 of the second connector 21.

In the case shown, the fourth connector 24 is connected to the case of the second component 13 from the outside, that may therefore be hermetic in order to preserve the geared motor 8 housed therein.

The second and the fourth connectors 21, 24 are directly coupled.

As mentioned above, the second and the fourth connectors 21, 24 may, if desired, be permanently connected and in particular they may remain connected regardless of whether the electric power supply unit 2 is seated or not, in case it is removable from the derailleur 3. In particular, the fourth connector 24 may be permanently connected to the second component 13 of the equipment 1, in the case shown to the support body 4 of the derailleur 3.

In the case shown wherein the flange 43 of the fourth connector 24 is without holes, a presser 55 is used having a through cavity 56 sized to form-fittingly accommodate the body 40 and press the flange 43 on the second component 13, for example from the outside as shown. The presser 55 is for example permanently connected through screws 57 extended through holes 58 of the presser and screwed in threaded holes 59 of the second component 13.

In the case shown, the presser 55 comprises a slit 60 extended up to its peripheral surface, sized to allow passage of the cable 25. Alternatively, the presser 55 might lack the slit 60, the cable 25 being made to pass through the through cavity 56 during the manufacture of the electric connector assembly 22.

It is understood that the fourth connector 24 might be connected to the second component 13 in another manner, in particular avoiding the presser 55 altogether; however the provision of the presser 55 allows it to be permanently connected and allows keeping a small size of the flange 43 and therefore of the fourth connector 24, favouring its passage in the through hole 50 and/or allowing a smaller size of the through hole 50 and consequently of the flange 43 of the third connector 23, with overall low weight and costs.

For the sake of simplicity, in FIG. 11 the electric conductors extended from the individual electric contacts 42 and gathered in the cable 25 are not shown, nor are the electric conductors extended internally to the second component 13 from the individual electric contacts 54 to the geared motor 8.

In order to ensure the hermetic seal, a gasket 61, for example elastomeric, may be provided between the second and the fourth connectors 21, 24. The presser 55 also provides for compressing the gasket 61, increasing its efficiency. On the other hand, between the presser 55 and the fourth connector 24 no sealing gasket is necessary.

It is understood that in the case of damage or breaking of the electric connector assembly 22, for example of its cable 25, its replacement is extremely simple and it may also be performed by a not specialised operator, in particular by the cyclist him/herself. Indeed, during removal of the electric connector assembly 22, the integrity and the possible hermetic sealing of the case of the second component 13, as well as the integrity and the possible hermetic sealing of the case accommodating the secondary cells of the electric power supply unit 1, electrically connected to the first electric connector 20, are not impaired and there is no access to the electric devices and to any electronic components internally thereto, therefore neither safety problems for the operator nor any risk of damaging the equipment 1 arise.

As emphasised above, the first connector 20 of the electric power supply unit 2 and the third connector 23 of the electric connector assembly 22 and, respectively, the fourth connector 24 of the electric connector assembly 22 and the second connector 21 of the second component 13, have matching electric contacts 52, 32; 42, 54 that establish the electric connection.

When the electric power supply unit 2 is removable, the first and the third connectors 23 establish the electric connection in the seated state of the electric power supply unit 2; whereas the second and the fourth connectors 21, 24 may also remain mechanically connected regardless of the presence or absence of the electric power supply unit 2.

In the case shown, in both cases four pairs of matching electric contacts 52, 32; 42, 54 are provided for, among which two pairs are connected to the negative pole (ground) and to the positive pole (power supply) of the secondary cells of the electric power supply unit 2 and are provided to lead the supply voltage from the electric power supply unit to the electrically powered device(s) arranged in the second component 13, for example to the geared motor, and possibly for recharging the secondary cells when the electric power supply unit 2 is not seated. The other two pairs of matching electric contacts 52, 32; 42, 54 may be used for example for full duplex serial connection between the equipment 1 and the electric power supply unit 2, when it is of the smart battery type. From the electric power supply unit 2 to the equipment 1, for example the residual charge, the number of charging cycles performed, etc., may be communicated. From the equipment 1 to the electric power supply unit 2, for example a serial number thereof, a firmware update program, a request to communicate said data, etc., may be communicated.

However, a different number of pairs of matching electric contacts 52, 32; 42, 54 and/or a different communication type and mode may be provided for.

Figure 12:
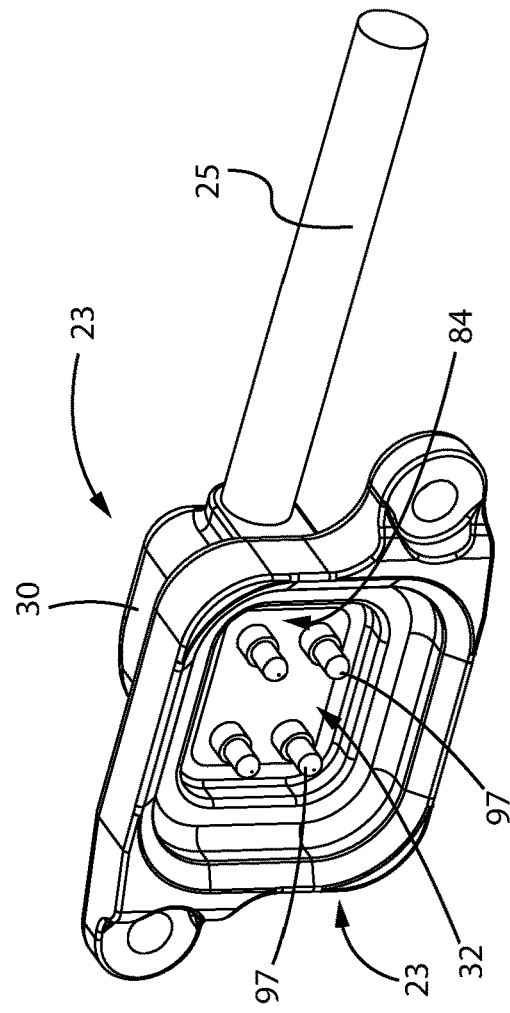
Figure 13:
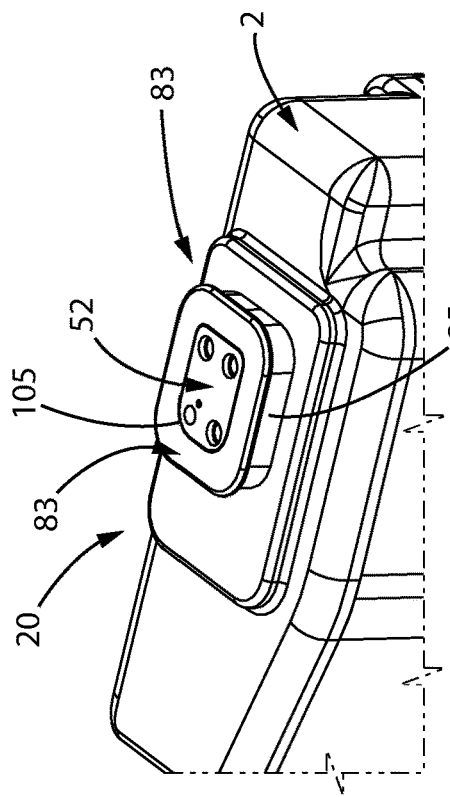

With reference in particular to FIGS. 12 and 13, the matching electric contacts 52, 32 of the first and the third connectors 20, 23 may be arranged in a protrusion 83 and a recess 84 of complementary shapes. In the case shown the protrusion 83 is made in the first connector 20 and the recess 84 is made in the third connector 23, but they could be inverted.

The protrusion 83 may have a peripheral groove 85 for housing and supporting the hermetic seal gasket 53 (FIG. 9).

A similar configuration may be provided for the matching electric contacts 42, 54 of the second and the fourth connectors 21, 24, for example providing the protrusion 83 in the second connector 21 and the recess 84 in the fourth connector 24, although the vice versa may be provided.

As shown in FIG. 11, the peripheral groove in the protrusion 83 in the second connector 21 is not necessary in that the hermetic seal gasket 61 is interposed between the second and the fourth connectors 21, 24 and is firmly held in position by the presser 55. A positioning throat 87 of the hermetic seal gasket 61 may however be provided for.

Arranging the protruding or "male" contacts in the recess 84, they turn out to be better protected also when the electric power supply unit 2 is not seated and, in the specific case described above of recess made in both the third and the fourth connectors 23, 24, during the handling of the electric connector assembly 22.

The "male" electric contacts may be of the pogo pin type.

Figure 14:
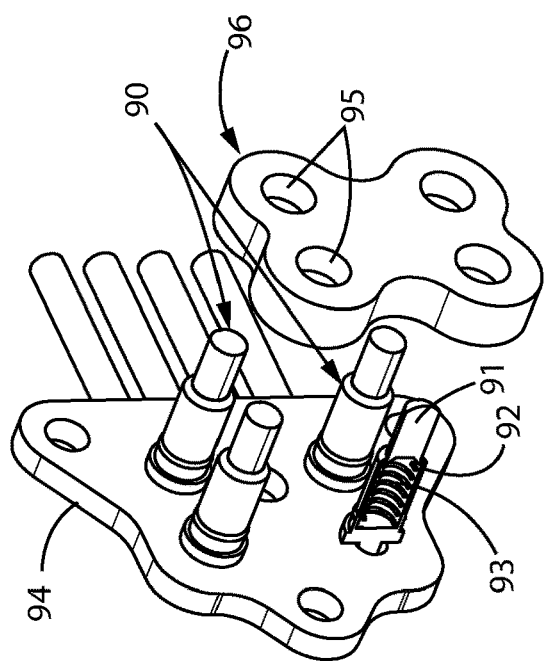
FIGS. 12-15 show some details relating to the electric connection of the electric power supply unit to the bicycle equipment.

A pogo pin—see the pogo-pins 90 of which also a section is schematically shown in FIG. 14—comprises a plunger 91 sliding in a blind barrel 92; the plunger 91 is forced in the position protruding from the barrel 92, outwards, by a helical spring 93. The pogo pin contacts are for example gathered on a printed circuit board or PCB 94 and the barrels 92 extend through parallel through holes 95 of an electrically insulating support 96 that may also serve as a hermetic seal. In the case shown, the PCB 94 and the support 96 are housed in the open chambers 31, 41 of the third and of the fourth connectors 23, 24 as visible in FIGS. 4, 8, 9, 11, wherein however some reference numerals are omitted for the sake of clarity. Alternatively to the PCB 94, the pogo-pin may be directly tinned to the respective electrical conductors.

Figure 15:
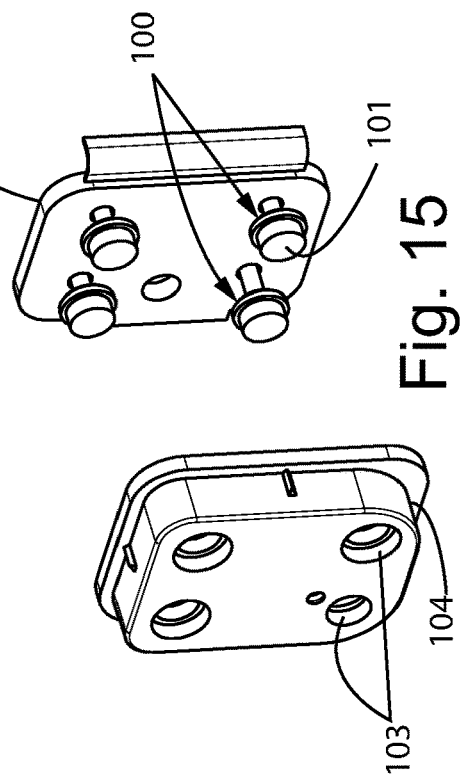

The matching contact 100 (FIG. 15) of a pogo pin comprises a plane or concave plate 101 contacting the plunger 91 of the pogo pin 90. The matching contacts 100 are for example gathered on a printed circuit board or PCB 102 and extend through parallel through holes 103 of an electrically insulating support 104 that may also serve as a hermetic seal.

Alternatively, the plate 101 may be directly embodied by a plated pad on the PCB 102. In the case shown, the PCB 102 and the support 104 are housed in the respective recesses of the first and of the second connector 20, 21 and of the second component 13, as visible in FIGS. 9, 10, 11, wherein however some reference numerals are omitted for the sake of clarity.

These types of matching contacts 90, 100 exhibit a high resilience of the electrical connection to shocks and vibrations, counteracting intermittent losses of electrical connection.

The ground electric contact 105 ("female" or matching contact 100 of the pogo pin 90) may be more outcropping than the other electric contacts of the electric power supply unit 2 (in the illustrative case shown). In this manner, it is the first to enter into mechanical and electric contact with the respective pogo pin 97 of the third connector 23 during the coupling of the matching connectors 20, 23; 21, 24, so as to protect the electronics by stabilizing the reference voltage level before the establishment of the remaining electrical connections.

The provision is particularly useful in case the battery power supply unit 2 is removably attachable to the seat 12; in any case it may also be provided for if the matching connectors 20, 23; 21, 24 are brought into connection, during the assembly of the equipment 1, when the electric power supply unit 2 is not seated and they are not of a removable type.

Although in the case shown both the third and the fourth connectors 23, 24 are provided with "male" contacts, they could be provided with "female" contacts, or either one may be provided with "male" contacts, and the other one may be provided with "female" contacts.

In the case shown, the through hole 50 is made in a plate-like member of the first component 11, so that in the mounted condition the body 30 of the third connector 23 protrudes from the opposite side 51 and is only in part accommodated in the through hole 50, as visible in FIG. 9, but this is not strictly necessary and the through hole 50 may be sized to accommodate the entire body 30 of the third connector 23 and may also be longer than the body 30 of the third connector 23.

The hole 50 may be made in a non-plate-like member of the first component 11, and may for example extend in a protrusion protruding from or crossing a case thereof.

The through hole 50 may be provided in the first component 11, but not at the seat 12 or in any case not where the third connector is connected to the first component 11. In that case the connectors 23, 24 turn out to be on two opposite sides of the through hole 50 and the cable turns out to be extended through the through hole 50.

The through hole 50 may be provided in the second component 13.

The seat 12 may also be formed internally to a case, preferably hermetic, of the first component 11.

Although it has been shown provided with a holed flat flange 33, other configurations of the third connector 23, allowing assembly thereof in the equipment 1 with the features mentioned above, are possible.

Although it has been shown provided with a flat flange 43, other configurations of the fourth connector 24 allowing assembly thereof in the equipment 1 with the features mentioned above, are possible.

It is repeated that the electric power supply unit 2 may be permanently or fixedly attached to the derailleur 3. In that case, the first electric connector 20 and the third electric connector 23 matching thereto need not necessarily be of the removably connectable type.

It is repeated that also the second and the fourth connectors 21, 24 need not necessarily be of the removably connectable type.

In general, each connector among the first, the second, the third and the fourth connectors 20, 21, 23, 24 may be fixedly connected to the respective component.

The first electric connector 20 may not be part of the electric power supply unit 2, rather be for example an electric connector provided in a case containing it, electrically connected to its secondary cells.

The mutual size of the connectors 23, 24 may be inverted, so that the third connector 23 may pass in the hole 50 in at least one orientation thereof, and the fourth connector 24 may not pass therein.

In the case shown, as mentioned the geared motor 8 is housed in the support body 4 and the seat 12 for the electric power supply unit 2 is provided in the proximal connecting arm 6. In this case, the electric connector assembly 22 extends between the support body 4 and the proximal connecting arm 6. The geared motor 8 may be housed in another component of the derailleur 3, different from the component 11 preselected for the seat for the electric power supply unit 2.

It is not even necessary that the derailleur 3 has a geared motor 8, the electric connector assembly 22 described above being used for the electric connection of the electric power supply unit 2 to a different electrically powered device, if provided for in two distinct components of the derailleur 3, in particular in case the two components are subject to a mutual motion during use of the bicycle as in the case of the derailleur 3.

The geared motor 8 described above is therefore to be understood as merely an example of an electrically powered device, that will be sometimes also indicated with the same reference numeral, namely electrically powered device 8.

The secondary cells of the electric power supply unit 2 may be recharged while the electric power supply unit 2 is on board of the bicycle, by providing for suitable recharge connectors, and/or the electric power supply unit 2 may be recharged in a recharge cradle after having been detached from the equipment 1, possibly exploiting the same first connector 20.

Although it has been described in the context of a rear electric derailleur 3, the invention disclosed herein, including all variants and generalizations thereof, also apply to a front electric derailleur.

Furthermore, the invention disclosed herein also applies to a different electrically powered bicycle equipment, for example one of those listed in the introductory part.

It is understood that hereinabove, also a mounting method of an electric connector 23 has been disclosed, for an electric power supply unit 2 comprising one or more secondary cells electrically connected to an electric connector 20 matching the electric connector 23 to be mounted, at a seat 12 of a first component 11 of a bicycle equipment 1 comprising an electrically powered device 8 supported by a second component 13 different from the first component 11, comprising:

providing an electric connector 21 in the second component 13, providing an electric connector assembly 22, comprising two electric connectors 23, 24 one of which is said electric connector 23 to be mounted and the other one is a connector 24 matching the electric connector 21 of the second component 13, and an electric cable 25 extended between its two electric connectors 23, 24, providing a through hole 50 in one of the first component 11 and the second component 13, wherein the through hole 50 and the two electric connectors 23, 24 of the electric connector assembly 22 have such mutual size that either one of the two electric connectors 23, 24 of the electric connector assembly 22 may pass, in at least one orientation thereof, in the through hole 50 and the other one of the two electric connectors 23, 24 of the electric connector assembly 22 may not pass in the hole 50, let said one of the two electric connectors 23, 24 of the electric connector assembly 22 pass through the through hole 50, subsequently permanently connecting said electric connector 23 to be mounted to the first component 11 and said connector 24 matching the electric connector 21 of the second component 13 to the second component 13.

Secondary features of said method are similarly to be considered disclosed hereinbefore.

The various embodiments, variants and/or possibilities of each component or group of components that have been described are to be meant as combinable with each other in any manner, unless they are mutually incompatible.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. An electrically powered bicycle equipment, comprising:
an electric power supply unit comprising one or more secondary cells and a first electric connector, the one or more secondary cells being electrically connected to the first electric connector,
a first component comprising an attachment seat for removably attaching the electric power supply unit,
a second component different from the first component, and
an electrically powered device being supported by the second component,
wherein the second component comprises a second electric connector electrically connected to the electrically powered device,
wherein a through hole is provided in the first component or in the second component, and
an electric connector assembly, separate and distinct from the first component and the second component, extended between the first component and the second component, comprising:
a third electric connector matching the first electric connector and detachably connected to the first component at the seat,
a fourth electric connector matching the second electric connector electric, and
an electric cable extended between the third electric connector and the fourth connector,
wherein the through hole, the third electric connector and the fourth electric connector have such mutual size that either one of the third or fourth electric connectors of the electric connector assembly may pass, in at least one orientation thereof, in the through hole and the other one of the third or fourth electric connectors of the electric connector assembly may not pass in the hole.

2. The electrically powered bicycle equipment according to claim 1, wherein the second component is movable with respect to the first component during intended use of the equipment, the electric cable being provided with a sufficient flexibility to allow its flexure and/or torsion during the assembly and/or the use of the bicycle equipment.

3. The electrically powered bicycle equipment according to claim 1, wherein the electric cable is connected to the third and to the fourth electric connectors in a fixed and hermetically sealed manner.

4. The electrically powered bicycle equipment according to claim 1, wherein a gasket is interposed between the first and the third electric connectors.

5. The electrically powered bicycle equipment according to claim 1, wherein the third electric connector is permanently connected to the first component on a side of the through hole corresponding to the seat, without any sealing gasket interposed between the third electric connector and the first component.

6. The electrically powered bicycle equipment according to claim 1, wherein the seat is formed internally to a case, preferably hermetic, of the first component.

7. The electrically powered bicycle equipment according to claim 1, wherein the third electric connector comprises a first body wherein a first open chamber is defined, containing the respective electric contacts, a first flange being provided for at a mouth of the first chamber, the first end of the electric cable extending from the first body, and wherein the third electric connector is permanently connected to the first component with the first flange on a side of the seat and the first body extended through or in the through hole.

8. The electrically powered bicycle equipment according to claim 1, wherein the electrically powered device is housed in a case, preferably hermetic, of the second component, wherein preferably the fourth electric connector is permanently connected to the case of the second component from the outside.

9. The electrically powered bicycle equipment according to claim 1, wherein the fourth electric connector comprises a second body wherein a second open chamber is defined, containing the respective electric contacts, a second flange being provided for at a mouth of the second chamber, the second end of the electric cable extending from the second body.

10. The electrically powered bicycle equipment according to claim 8, wherein the fourth electric connector comprises a second body wherein a second open chamber is defined, containing the respective electric contacts, a second flange being provided for at a mouth of the second chamber, the second end of the electric cable extending from the second body, and wherein
the second flange is without holes, a presser having a through cavity sized to accommodate the second body pressing the second flange on the second component from the outside, the presser preferably comprising a slit extending up to its peripheral surface, sized to allow passage of the electric cable.

11. The electrically powered bicycle equipment according to claim 9, wherein a gasket is interposed between the second flange and the second component.

12. The electrically powered bicycle equipment according to claim 10, wherein a gasket is interposed between the second flange and the second component.

13. The electrically powered bicycle equipment according to claim 1, wherein the electric power supply unit is removably attachable to the seat, the first and the third electric connectors being removably connectable, wherein preferably the first electric connector is the electric connector of the electric power supply unit itself.

14. The electrically powered bicycle equipment according to claim 1, wherein the bicycle equipment is a bicycle derailleur, comprising:
a plurality of mutually movable components, comprising a support body configured to be attached a bicycle frame, a chain guide and a pair of connecting arms extended between the support body and the chain guide, and
a geared motor controlling the mutual motion between chain guide and support body,
wherein said first component and said second component are two preselected components of the mutually movable components.

15. The electrically powered bicycle equipment according to claim 14, wherein the derailleur is a rear derailleur and the first component is the proximal connecting arm and/or the second component is the support body.

16. A mounting method of an electric connector, for an electric power supply unit comprising one or more secondary cells electrically connected to an electric connector matching the electric connector to be mounted, at a seat of a first component of a bicycle equipment comprising an electrically powered device supported by a second component different from the first component, comprising:
providing an electric connector in the second component, providing an electric connector assembly, comprising two electric connectors one of which is said electric connector to be mounted and the other one is a connector matching the electric connector of the second component, and an electric cable extended between its two electric connectors, providing a through hole in one of the first component and the second component, wherein the through hole and the two electric connectors of the electric connector assembly have such mutual size that either one of the two electric connectors of the electric connector assembly may pass, in at least one orientation thereof, in the through hole and the other one of the two electric connectors of the electric connector assembly may not pass in the hole, passing said one of the two electric connectors of the electric connector assembly through the through hole, successively, detachably connecting said electric connector to be mounted to the first component and said electric connector matching the electric connector of the second component to the second component.

* * * * *